(12) United States Patent
Kim et al.

(10) Patent No.: US 8,254,484 B2
(45) Date of Patent: Aug. 28, 2012

(54) METHOD OF DIRTY PAPER CODING USING NESTED LATTICE CODES

(75) Inventors: Sung Hwan Kim, Suwon-si (KR); Song Soo Hwang, Yongin-si (KR); Sang Boh Yun, Seongnam-si (KR); Sang Hyun Lee, Austin, TX (US); Sung Yoon Jung, Seoul (KR); Sriram Viswanath, Austin, TX (US)

(73) Assignees: Samsung Electronics Co., Ltd., Suwon-si (KR); The Board of Regents of the University of Texas System, Austin, TX (US)

( * ) Notice: Subject to any disclaimer, the term of this patent is extended or adjusted under 35 U.S.C. 154(b) by 316 days.

(21) Appl. No.: 12/686,871

(22) Filed: Jan. 13, 2010

(65) Prior Publication Data
US 2010/0177839 A1 Jul. 15, 2010

(30) Foreign Application Priority Data

Jan. 13, 2009 (KR) ........................ 10-2009-0002807
Jan. 12, 2010 (KR) ........................ 10-2010-0002874

(51) Int. Cl.
*H04L 23/02* (2006.01)

(52) U.S. Cl. ........ 375/265; 375/260; 375/262; 375/285; 375/299; 375/346; 375/347; 455/63.1; 455/67.13; 455/101; 455/114.2; 455/132; 455/500; 455/501; 455/562.1; 370/334; 370/335; 370/342; 341/173; 341/180; 329/349; 329/353; 714/751; 714/752; 327/551

(58) Field of Classification Search .................. 375/260, 375/262, 265, 267, 285, 299, 346, 347; 455/63.1, 455/67.13, 101, 114.2, 132, 500, 501, 562.1; 370/334, 335, 342; 341/173, 180; 329/349, 329/353; 714/751, 752; 327/551
See application file for complete search history.

(56) References Cited

U.S. PATENT DOCUMENTS

| 2006/0210070 | A1 | 9/2006 | Reznik et al. | |
|---|---|---|---|---|
| 2007/0079742 | A1* | 4/2007 | Liu et al. | 114/102.1 |
| 2008/0018535 | A1* | 1/2008 | Hwang et al. | 342/368 |
| 2008/0141079 | A1 | 6/2008 | Chindapol et al. | |
| 2008/0198071 | A1* | 8/2008 | Hwang et al. | 342/373 |

* cited by examiner

Primary Examiner — Leon Flores
(74) Attorney, Agent, or Firm — Jefferson IP Law, LLP (57) ABSTRACT

A method of Dirty Paper Coding DPC using nested lattices is disclosed. The complexity of DPC can be reduced by scaling nested lattices and mapping interference to a lattice point of the scaled lattice.

8 Claims, 5 Drawing Sheets

FIG. 6 ium Intellectual Property Office on Jan. 13, 2009 and assigned Serial No. 10-2009-0002807 and a Korean patent application filed in the Korean Intellectual Property Office on Jan. 12, 2010 and assigned Serial No. 10-2010-0002874, the entire disclosure of which are hereby incorporated by reference.

METHOD OF DIRTY PAPER CODING USING NESTED LATTICE CODES

PRIORITY

This application claims the benefit under 35 U.S.C. §119(a) of a Korean patent application filed in the Korean Intellectual Property Office on Jan. 13, 2009 and assigned Serial No. 10-2009-0002807 and a Korean patent application filed in the Korean Intellectual Property Office on Jan. 12, 2010 and assigned Serial No. 10-2010-0002874, the entire disclosure of which are hereby incorporated by reference.

BACKGROUND OF THE INVENTION

1. Field of the Invention

The present invention relates to a method of channel coding for a wireless communication system. More particularly, the present invention relates to a method of Dirty Paper Coding (DPC) using nested lattice codes.

2. Description of the Related Art

A broadcast channel is one of the most fundamental entities in multi-user information theory. For the multi-antenna Gaussian broadcast channel, it is known in the art that Dirty Paper Coding (DPC) can achieve the entire capacity region.

One of the biggest stumbling blocks for this channel has been the 'impracticality' of DPC. This is for two reasons. First, DPC requires accurate knowledge of the channel state information for all the channels at the transmitter. Second, even with the state known, it is exponentially complex to perform the encoding and decoding process required by existing DPC mechanisms. Thus, many papers have been subsequently published that focus on approximating DPC using other mechanisms such as Tomlinson-Harashima precoding, zero-forcing precoding and Minimum Mean Square Error (MMSE) precoding. However, results for cellular networks have shown that DPC can have large gains over approximate strategies.

In addition, when the channel state is known at the transmitter, it can be shown that DPC can be implemented exactly (without approximations) with a polynomial-time complexity on average. This means that, for slowly fading environments with channel state feedback, DPC might in fact be a low-complexity technique and thus, closer to being practical than previously understood. Hence, it is necessary to devise a low-complexity mechanism for performing DPC.

SUMMARY OF THE INVENTION

An aspect of the present invention is to address at least the above-mentioned problems and/or disadvantages and to provide at least the advantages described below. Accordingly, an aspect of the present invention is to provide a method of low-complexity dirty paper coding using nested lattice codes.

In accordance with an aspect of the present invention, a method of dirty paper encoding using nested lattices for a transmitter sending to at least two receivers is provided. The method includes scaling a lattice so that interference due to a second receiver is mapped to a lattice point of a lattice for the first receiver, subtracting the interference from a signal to be sent to the first receiver, mapping the subtraction result on the fundamental Voronoi region of the lattice for the first receiver, and transmitting the signal corresponding to the mapping result.

In an exemplary implementation, one of the lattice for the first receiver and the lattice for the second receiver may be scaled in lattice scaling.

In accordance with another aspect of the present invention, a method of dirty paper decoding using nested lattices for a receiver receiving from a transmitter that sends to at least two receivers is provided. The method includes receiving a signal from the transmitter, and decoding the received signal through a modulo operation with respect to a scaled lattice.

In an exemplary implementation, a lattice for individual receivers may be scaled for decoding.

In an exemplary feature of the present invention, nested lattice coding is proposed that provides a simple approach to constructing codes for dirty-paper coding for broadcast channels. This simplicity comes from employing a nested lattice that allows linear-time encoding and sphere decoding. Thereby, the capacity for a Multiple Input Single Output (MISO) broadcast channel is achieved.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiment of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method of Dirty Paper Coding (DPC) composed of lattice encoding by the encoder at the transmitter and lattice decoding by the decoder at the receiver.

Figure 1:
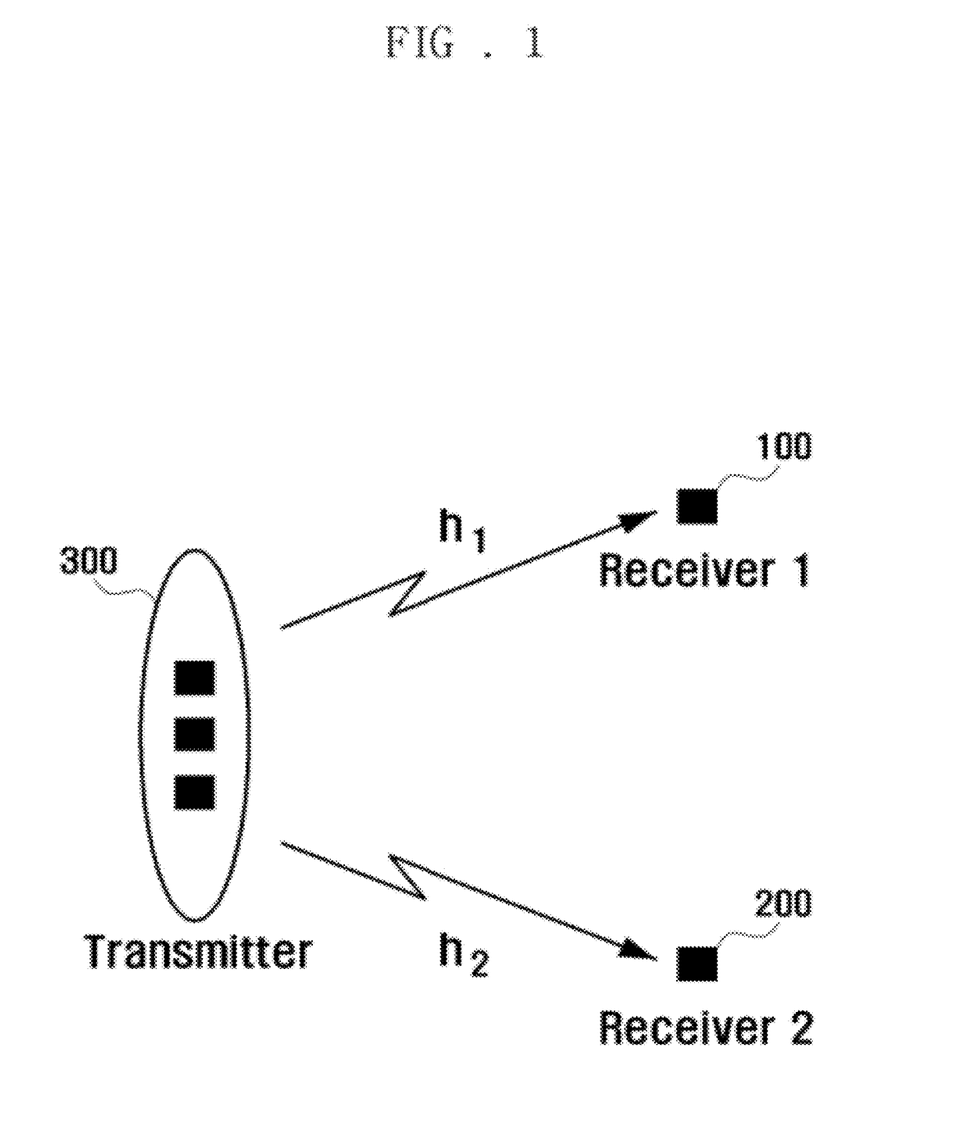
FIG. 1 illustrates a Multiple Input Single Output (MISO) broadcast channel according to an exemplary embodiment of the present invention.
Figure 2:
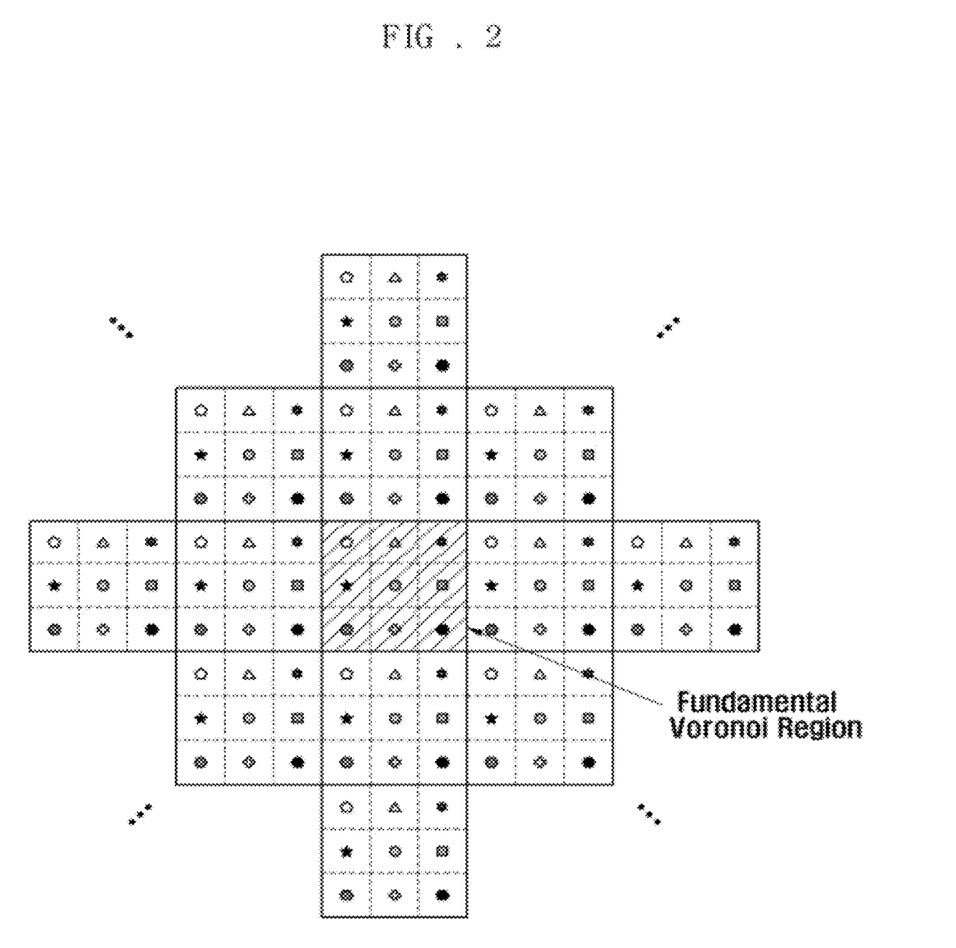
FIG. 2 illustrates an example of a lattice structure for Dirty Paper Coding (DPC) according to an exemplary embodiment of the present invention.
Figure 3:
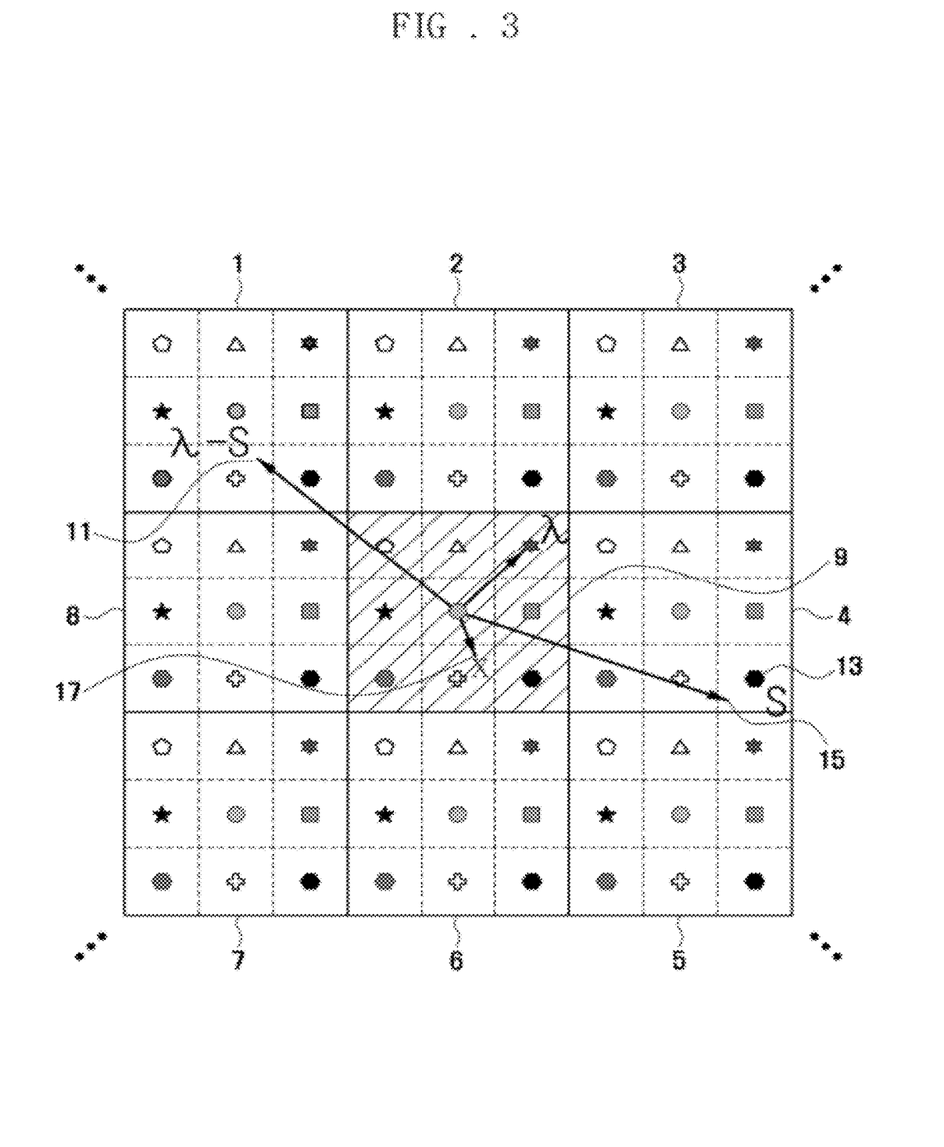
FIG. 3 illustrates a related approach to DPC using a nested lattice.
Figure 4:
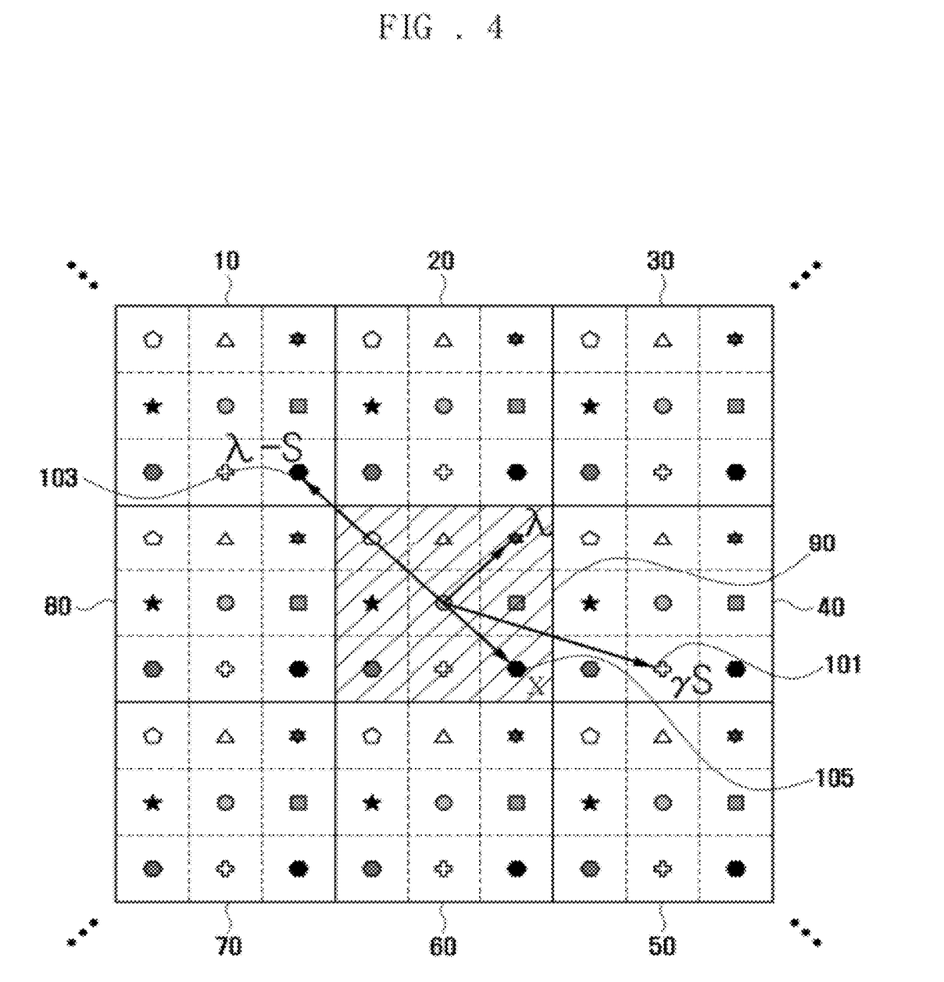
FIG. 4 illustrates an approach to DPC using a nested lattice according to an exemplary embodiment of the present invention.

FIG. 1 illustrates a Multiple Input Single Output (MISO) broadcast channel. FIG. 2 illustrates an example of a lattice structure for DPC. FIG. 3 illustrates a related approach to DPC using nested lattices. FIG. 4 illustrates an approach to DPC using nested lattices according to an exemplary embodiment of the present invention.

System Model

In the following equations, all vectors are assumed to be column vectors unless specified otherwise. A superscripted T denotes the transpose operation and 'mod' denotes a modulo operation with respect to a lattice.

The system is assumed to be a MISO broadcast channel as depicted in FIG. 1. For simplicity, only two receivers 100 and 200 are illustrated in the system. Of course, this is for simplicity of explanation and not to be considered a limitation of the invention. Given that X refers to the transmitted signal by the transmitter 300, $Y_1$ and $Y_2$ are the signals received by the receivers 100 and 200 respectively, $h_1$ and $h_2$ refer to channel state information, and $N_1$ and $N_2$ refers to noise, the MISO broadcast channel may be mathematically characterized by Equation 0.

$$Y_1 = h_1^T X + N_1$$

$$Y_2 = h_2^T X + N_2 \quad \text{[Equation 0]}$$

Here, all symbols are assumed to be real-valued, but the extension to the complex case is straightforward. Also, the transmit power of the transmitter 300 is limited to a power of P, and the additive noise is Gaussian with variance N. It is assumed that the channel state information $h_1$ and $h_2$ is known to the transmitter 300 and the receivers 100 and 200 exactly. It is well known in the art that the capacity region of this channel can be achieved by DPC.

DPC has been implemented by Gel'fand-Pinsker-style binning. However, in recent work, lattice codes have been used to perform this operation. Specifically, Erez, Shamai and Zamir have shown that nested lattice codes can be used to perform DPC for the point-to-point Gaussian channel with additive Gaussian state, which has been subsequently generalized to any state distribution. The encoding and decoding scheme introduced is described later. The point-to-point channel with additive state is assumed to have the form given by Equation 1.

$$Y = X + S + N \quad \text{[Equation 1]}$$

Here, the transmitted message X has a power constraint P, the additive state S is known to the transmitter 300, and the noise variance is N.

A 'good' lattice $\Lambda$ (in the sense of channel coding) is chosen as the 'fine' lattice used to communicate the messages, which is nested with a 'coarse' lattice L that represents the power constraint $(E_k \| [X] \mod L \|^2 \leq P)$.

Referring to FIG. 3, the coarse lattice is a sub-lattice of the fine lattice, and the fine lattice is partitioned into equal regions (or cells) 1, 2, 3, 4, 5, 6, 7, 8, and 9 such that each region contains exactly one point of the coarse lattice. Since each region contains nine points, the nesting ratio is nine.

Given the lattice point $\lambda \in \Lambda$ to be communicated, the state S known to the transmitter 300, and $\alpha = P/(P+N)$, the encoding process is given by Equation 2, $$X = [\lambda - \alpha S] \mod L, \quad \text{[Equation 2]}$$

where X is the dirty-paper-encoded output to be transmitted through the channel. In FIG. 3, an additive state S 15 known to the transmitter 300 is subtracted from a signal $\lambda$ ($\lambda$-S 11) to be transmitted, and the result X is mapped to a lattice point 17 through the modulo operation.

Thereafter, X is decoded using lattice decoding at the receiver. The straightforward application of this lattice-based encoding scheme to broadcast channels is still highly complex and thus not easy to implement. Moreover, if the additive state S is generated from a Gaussian codebook or another codebook, then the encoding operation given by Equation 2 is exceedingly hard to perform.

Contributions of the present invention are twofold. First, the encoding operation is simplified to a linear-complexity operation by the use of the lattice structure. Second, the lattice decoding operation is simplified using a sphere decoding algorithm that has a polynomial-time average complexity. Therefore, the overall encoding and decoding operation has a polynomial time complexity and is thus closer to being implementable in practice.

Low-Complexity Dirty-Paper Encoding

In an exemplary implementation, the first receiver 100 has a dirty-paper-encoded codebook with a transmit power of P for some $0 \leq \beta \leq 1$. Traditionally, the codebook for the second receiver 200 (transmitted non-dirty-paper-encoded) is constructed first and then the codebook for the first receiver 100 (transmitted dirty-paper-encoded) is constructed. In an exemplary implementation of the present invention, this order is reversed.

First, a 'good' lattice $\Lambda$ (in the sense of channel coding) for the first receiver 100 is chosen. This fine lattice $\Lambda$ is nested with a coarse lattice $L_1$ which represents the power constraint $\beta P$.

Note that, when DPC is used, optimal covariances $\Sigma_1$ and $\Sigma_2$ satisfying the power constraints can be associated with the codebooks of the first receiver 100 and second receiver 200 respectively. It is shown that the optimal choice of $\Sigma_1$ and $\Sigma_2$ for MISO broadcast channels is unit rank matrices for the entire capacity region. This allows $\Sigma_1$ and $\Sigma_2$ to be rewritten in Equation 3, $$\Sigma_1 = \beta P a a^T$$

$$\Sigma_1 = \bar{\beta} P a a^T \quad \text{[Equation 3]}$$

for some vectors a and b respectively, and $\bar{\beta} = 1 - \beta$. Now, the notation given by Equation 4 is introduced.

$$h_{11} = h_1^T a$$

$$h_{12} = h_1^T b$$

$$h_{21} = h_2^T a$$

$$h_{22} = h_2^T b. \quad \text{[Equation 4]}$$

Returning to the lattice construction, it is known that a nested lattice ensemble $(\Lambda, L_1)$ exists with a fundamental volume such that, on average, the rate achieved by this ensemble for the first receiver 100 with no interference present is given by Equation 5.

$$\frac{1}{2}\log\left(1 + \frac{h_{11}^2 \beta P}{N}\right).$$ [Equation 5]

This, in essence, is the maximum rate seen without any interference by the first receiver 100 when using the transmit covariance $\Sigma_1$ for its codebook generation, and lies on the capacity region boundary for the channel with the appropriate choice for $\Sigma_1$.

Next, a codebook is generated for the second receiver 200. The lattice $\Lambda$ of the first receiver 100 has each element 'scaled' by $$\frac{1}{\alpha_1 h_{12}}$$

to generate a new lattice $$\tilde{\Lambda} = \frac{1}{\alpha_1 h_{12}} \Lambda.$$

Note that the desired rate for the second receiver 200 so that it lies on the capacity region boundary is given by Equation 6.

$$\frac{1}{2}\log\left(1 + \frac{h_{22}^2 \bar{\beta} P}{h_{21}^2 \beta P + N}\right).$$ [Equation 6]

This rate is, for non-trivial values of $\beta$, much smaller than the rate for the first receiver 100. Thus, the lattice codebook to be used by the second receiver 200 should, in general, be of a much lower rate than that of the first receiver 100. Hence, a sub-lattice of $\tilde{\Lambda}$ given by $\Gamma = M\tilde{\Lambda}$ is found for some positive integer M that, when nested with a coarse lattice $L_2$ representing the power constraint $\bar{\beta}P$ for the second Receiver 200, results in the rate of Equation 6.

The nested lattices $(\Lambda, L_1)$ for the first receiver 100 and the nested lattices $(\Gamma, L_2)$ for the second receiver 200 are thus constructed to have very specific properties.

That is, they are 'good' lattices for communication by themselves, ensuring that they can be used for encoding and decoding in a point-to-point communication. They come from an ensemble that, on average, possesses enough codewords to ensure that the desired rates on the broadcast channel can be achieved. More particularly, they are related by a scaling factor. This relationship is central to ensuring that DPC can be performed effectively.

Given the desire to communicate lattice points $\lambda \in \Lambda$ and $\gamma \in \Gamma$, it is assumed that the lattice-coded output for the second receiver 200 is given by Equation 7, $$v = [\gamma - \Delta_2] \bmod L_2$$ [Equation 7]

where the 'dither' $\Delta_2$ is a random variable uniformly distributed over a fundamental region of $L_2$. The dirty-paper-coded output for the first receiver 100 is constructed using Equation 8, $$u = [\lambda - \alpha_1 h_{12} v - \Delta_1] \bmod L_1$$ [Equation 8]

where the dither $\Delta_1$ is a random variable uniformly distributed over a fundamental region of $L_1$. Note that, by construction, $\alpha_1 h_{12} v$ is an element of $\Lambda$. Thus, $\lambda - \alpha_1 h_{12} v$ is an element of $\Lambda$. The modulo operation in encoding can thus be implemented in linear time. Ultimately, the transmitted vector at time i may be given by Equation 9.

$$x_i = a u_i + b v_i.$$ [Equation 9]

Decoding Strategy

Over a block of size n, the first receiver 100 receives a signal through the channel given by Equation 10.

$$\begin{aligned} y_1 &= h_1^T a u + h_1^T b v + n_1 \\ &= h_{11} u + h_{12} v + n_1. \end{aligned}$$ [Equation 10]

The dirty paper decoding for the first receiver 100 proceeds with linear filtering and dither removing followed by the modulo operation over $L_1$, as given by Equation 11, $$\begin{aligned} y_1' &= [\alpha y_1 + \Delta_1] \bmod L_1 \\ &= [\alpha(h_{11} u + h_{12} v + n_1) + \Delta_1] \bmod L_1 \\ &= [\lambda + \alpha h_{11} u + (\alpha h_{12} v + \Delta_1 - \lambda) + \alpha n_1] \bmod L_1 \\ &= [\lambda + \alpha h_{11} u + (-u) + \alpha n_1] \bmod L_1 \\ &= [\lambda - (1 - \alpha h_{11}) u + \alpha n_1] \bmod L_1 \\ &= [\lambda + n_1'] \bmod L_1 \end{aligned}$$ [Equation 11]

where the fourth step follows because the modulo operation is distributive, and $n'_1 = [-(1-\alpha h_{11})u + \alpha n_1] \bmod L_1$. Here, the linear-filtering factor $\alpha_1 = h_{11}\beta P/(h_{11}^2 \beta P + N)$ is taken in order to minimize the variance of the effective noise (i.e., $\alpha_1$ is chosen as an MMSE scaling factor). Since the MMSE scaling and sphere decoding are of linear-time complexity, the decoding for the first receiver 100 is performed in linear time. Due to the dither $\Delta_1$, the encoded output for the first receiver 100 u is uniform over a fundamental region of $L_1$, and thus u is independent of $\lambda$ and is equivalent in distribution to $\Delta_1$.

With these facts, the bound of the second moment of the effective noise $n'_1$ is simply calculated by Equation 14, $$\frac{1}{n} E\|n_1'\|^2 \leq \frac{1}{n} E\|(1 - \alpha h_{11})\Delta_1 + \alpha n_{11}\|^2 =$$

$$(1 - \alpha h_{11})^2 \beta P + \alpha^2 N = \frac{\beta P N}{h_{11}^2 \beta P + N},$$ [Equation 14]

where the second step follows from the orthogonality principle.

To see the rate achieved by the first receiver 100, the message can be denoted by a random variable $\Lambda$ uniformly distributed over the fundamental region of $L_1$. Then, the information rate satisfies Equation 15, $$\begin{aligned} \frac{1}{n} I(\Lambda; Y_1') &= \frac{1}{n} h(Y_1') - \frac{1}{n} h(Y_1' \mid \Lambda) \\ &= \frac{1}{2} \log \frac{\beta P}{G(L_1)} - \frac{1}{n} h(n_1'), \end{aligned}$$ [Equation 15]

where $G(L_1)$ is the normalized second moment of $L_1$. Since the white Gaussian random vector has the maximal entropy among random vectors with the same second moment, Equation 16 can be obtained from Equation 14.

$$\frac{1}{n}h(n'_1) \leq \frac{1}{2}\log\left(2\pi e \frac{\bar{\beta}PN}{h_{11}^2\beta P + N}\right).$$ [Equation 16]

Thus, Equation 17 can be determined as, $$\frac{1}{n}I(\Lambda; Y'_1) \geq \frac{1}{2}\log\frac{\bar{\beta}P}{G(L_1)} - \frac{1}{2}\log\left(2\pi e \frac{\bar{\beta}PN}{h_{11}^2\beta P + N}\right)$$ [Equation 17]

$$= \frac{1}{2}\log\left(1 + \frac{h_{11}^2\beta PN}{N}\right) - \frac{1}{2}\log 2\pi e G(L_1).$$

It is shown that, for any positive ε and sufficiently large block size n, there exists an n-dimensional lattice L satisfying Equation 18.

$$\frac{1}{2}\log 2\pi e G(L_1) < \varepsilon$$ [Equation 18]

If such a lattice is chosen as the (coarse) sub-lattice $L_1$, for any positive ε and sufficiently large n, Equation 17 is simplified into Equation 19.

$$\frac{1}{n}I(\Lambda; Y'_1) \geq \frac{1}{2}\log\left(1 + \frac{h_{11}^2\beta PN}{N}\right) - \varepsilon_1$$ [Equation 19]

Equation 19 indicates that the capacity can be approached arbitrarily close with the appropriate choice of the coarse lattice. This indicates that the rate given by Equation 5 is achieved by the first receiver 100 through DPC.

The second receiver 200 performs lattice decoding, which can be implemented in linear time by sphere decoding. The second receiver 200 receives a signal through the channel given by Equation 20.

$$y_2 = h_2^T bv + h_2^T au + n_2$$ [Equation 20]

$$= h_{22}v + h_{21}u + n_2.$$

The lattice decoding for the second receiver 200 proceeds with the linear filtering and dither removing followed by the modulo operation over $L_2$, as given by Equation 21, $$y'_2 = [\alpha_2 y_2 + \Delta_2]\mod L_2$$ [Equation 21]

$$= [\alpha_2(h_{22}v + h_{21}u + n_2) + \Delta_2]\mod L_2$$

$$= [v + \Delta_2 + (\alpha_2 h_{22} - 1)v + \alpha_2 h_{12}u + \alpha_2 n_2]\mod L_2$$

$$= \begin{bmatrix}[\gamma + \Delta_2]\mod L_2 \Delta_2 - (1 - \alpha_2 h_{22})v + \\ \alpha_2 h_{21}u + \alpha_2 n_2\end{bmatrix}\mod L_2$$

$$= [\gamma - (1 - \alpha_2 h_{22})v + \alpha_2 h_{21}u + \alpha_2 n_2]\mod L_2$$

$$= [\gamma + n'_2]\mod L_2$$

where $\alpha_2$ is chosen as the MMSE scaling factor $h_{22}\bar{\beta}/(h_{22}^2\bar{\beta}P + h_{21}^2\beta P + N)$, and $n'_2 \equiv [-(1-\alpha_2 h_{22})v + \alpha_2 h_{21}u + \alpha_2 n_2] \mod L_2$.

Note that, due to the dither $\Delta_2$, the lattice coded output v is uniform over the fundamental region of $L_2$ independently of γ. Also, u and $n_2$ are independent of γ. From Equation 8, it is seen that v is uniform over $L_1$ independently of u by the same notion as for the independence between γ and u. Therefore, it is seen that $n_2$ is equivalent in distribution to $[(1-\alpha_2 h_{22})\Delta_1 + \alpha_2 h_{21}\Delta_2 + \alpha_2 n_2] \mod L_2$. Then, the second moment of $n'_2$ satisfies Equation 22.

$$\frac{1}{n}E\|n'_1\|^2 \leq \frac{1}{n}E\|(1 - \alpha_2 h_{22})\Delta_1 + \alpha_2 h_{21}\Delta_2 + a_2 n_2\|^2 =$$ [Equation 22]

$$(1 - \alpha_2 h_{22})^2\bar{\beta}P + \alpha_2^2 h_{21}^2\beta P + \alpha_2^2 N = \frac{\bar{\beta}P(h_{21}^2\beta P + N)}{h_{22}^2\bar{\beta}P + h_{21}^2\beta P + N}.$$

In the same way as in Equation 16, Equation 23 results.

$$\frac{1}{n}h(n'_2) \leq \frac{1}{2}\log\left(2\pi e \frac{\bar{\beta}P(h_{21}^2\beta P + N)}{h_{22}^2\bar{\beta}P + h_{21}^2\beta P + N}\right)$$ [Equation 23]

Then, the information rate between the message F and the lattice-decoded output $Y'_2$ satisfies Equation 24.

$$\frac{1}{n}I(\Gamma; Y'_2) \geq \frac{1}{2}\log\frac{\bar{\beta}P}{G(L_2)} - \frac{1}{2}\log\left(2\pi e \frac{\bar{\beta}P(h_{21}^2\beta P + N)}{h_{22}^2\bar{\beta}P + h_{21}^2\beta P + N}\right) =$$ [Equation 24]

$$\frac{1}{2}\log\left(1 + \frac{h_{22}^2\bar{\beta}P}{h_{21}^2\beta P + N}\right) - \frac{1}{2}\log 2\pi e G(L_2).$$

If such a lattice is chosen satisfying Equation 18 for the (coarse) sub-lattice $L_2$, Equation 25 results for any positive $\varepsilon_2$ and sufficiently large n.

$$\frac{1}{n}I(\Lambda; Y'_1) \geq \frac{1}{2}\log\left(1 + \frac{h_{22}^2\bar{\beta}P}{h_{21}^2\beta P + N}\right) - \varepsilon_2$$ [Equation 25]

Therefore, the achievability of the rate given by Equation 6 is illustrated.

Hereinafter, a description is given of exemplary dirty-paper encoding and decoding according to the present invention.

Figure 5:
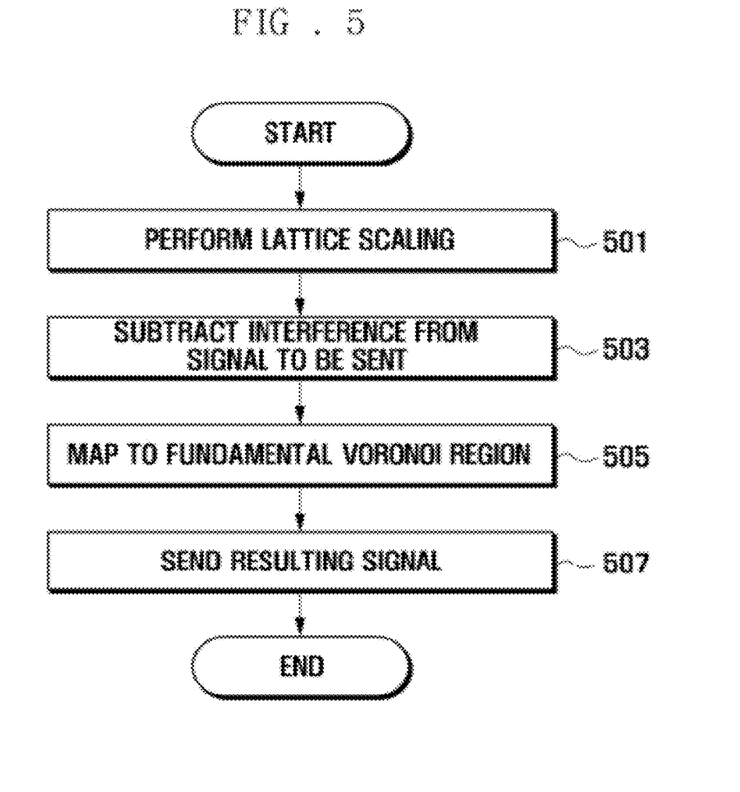
FIG. 5 is a flowchart of a procedure for dirty paper encoding using nested lattices according to an exemplary embodiment of the present invention.

FIG. 5 is a flowchart of a procedure for dirty paper encoding using nested lattices according to an exemplary embodiment of the present invention. FIG. 4 illustrates an approach to DPC of FIG. 5.

Referring to FIG. 4, the coarse lattice is a sub-lattice of the fine lattice, and the fine lattice is partitioned into equal regions (or cells) 10, 20, 30, 40, 50, 60, 70, 80, and 90 such that each region contains exactly one point of the coarse lattice. Since each region contains nine points, the nesting ratio is nine A signal that is to be sent by a transmitter 300 to a second receiver 200 ($\alpha_1 h_{12} v$) may be treated as interference S as to a first receiver 100. In FIG. 3 (related to an existing approach), interference S (denoted by reference symbol 15) is not exactly mapped to a lattice point 13, causing complex encoding and decoding.

Referring to FIG. 5, for given data λ to be sent to the first receiver 100, unlike the case of FIG. 3, the transmitter 300 performs lattice scaling in step 501 so that interference S is exactly mapped to a lattice point 101 (as shown in FIG. 4, γ ∈ Γ).

At step 501, as described above, the fine lattice for the second receiver 200 may be scaled or the fine lattice for the first receiver 100 may be scaled, on the basis of Equation 5 or Equation 6.

The transmitter 300 subtracts interference S from data λ to be sent for DPC in step 503. The result $\lambda - \alpha_1 h_{12} v$ is also exactly mapped to a lattice point 103 as shown in FIG. 4.

The transmitter 300 maps the subtraction result over the fundamental Voronoi region (indicated by reference symbol 90 in FIG. 4) in step 505. That is, the subtraction result is mapped to a lattice point 105. Step 505 is performed using a modulo operation with respect to a scaled lattice, indicated by Equation 8.

Based on lattice scaling, as shown in FIG. 4, the scaled interference, the result of subtraction of interference from the data to be sent, and the mapping result of the subtraction coincide with corresponding lattice points.

Thereafter, the transmitter 300 sends the DPC-coded signal to the first receiver 100 in step 507.

As described above, in the existing DPC approach depicted in FIG. 3, interference, the result of subtraction of interference from the data to be sent, and the mapping result of the subtraction do not exactly coincide with corresponding lattice points, causing complex DPC encoding. In the DPC approach according to an exemplary embodiment of the present invention as depicted in FIG. 4, based on lattice scaling, the scaled interference, the result of subtraction of interference from the data to be sent, and the mapping result of the subtraction coincide with corresponding lattice points, reducing complexity of DPC encoding.

Next, a description is given of exemplary dirty-paper decoding according to the present invention.

Figure 6:
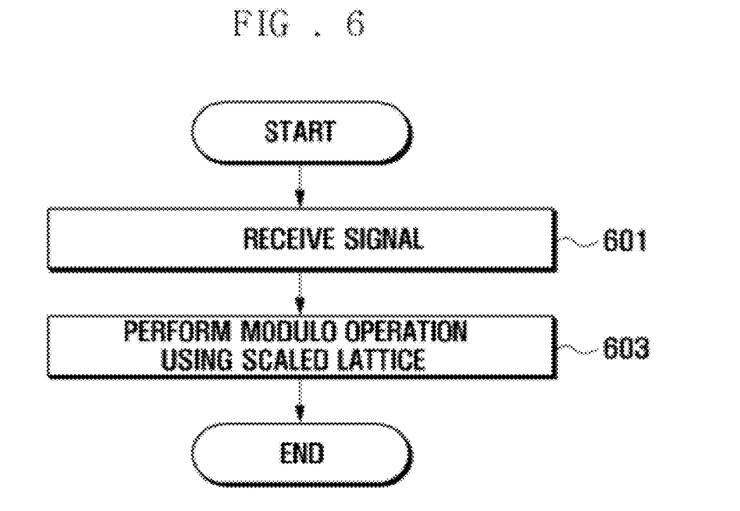
FIG. 6 is a flowchart of a procedure for dirty paper decoding using nested lattices according to an exemplary embodiment of the present invention Throughout the drawings, it should be noted that like reference numbers are used to depict the same or similar elements, features, and structures.

FIG. 6 is a flowchart of a procedure for dirty paper decoding using nested lattices according to an exemplary embodiment of the present invention. As described before with reference to FIG. 5, because the transmitted signal may lack interference owing to subtraction, the subtracted interference may have to be added back to the signal received by a receiver.

Referring to FIG. 6, the first receiver 100 receives a signal from the transmitter 300 in step 601. The signal received by the first receiver 100 contains a signal that is obtained by subtracting the signal for the second receiver 200 from the signal for the first receiver 100, and the signal for the second receiver 200.

The first receiver 100 decodes the received signal through linear filtering and dither removing followed by the modulo operation, as indicated by Equation 11 in step 603. At step 603, decoding is performed using a scaled lattice. As described before, the fine lattice for the second receiver 200 may be scaled or the fine lattice for the first receiver 100 may be scaled, on the basis of Equation 5 or Equation 6.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of dirty paper encoding using nested lattices for a transmitter transmitting to at least two receivers, the method comprising:

scaling a lattice so that interference due to a second receiver is mapped to a lattice point of a lattice for the first receiver;

subtracting the interference from a signal to be sent to the first receiver;

mapping the subtraction result on a fundamental Voronoi region of the lattice for the first receiver; and transmitting a signal corresponding to the mapping result.

2. The method of claim 1, wherein the scaling of the lattice comprises scaling at least one of the lattice for the first receiver and a lattice for the second receiver.

3. The method of claim 2, wherein the scaling of the at least one of the lattice for the first receiver and the lattice for the second receiver comprises using at least one of the following equations, $$\frac{1}{2}\log\left(1 + \frac{h_{11}^2 \beta PN}{N}\right) \text{ and } \frac{1}{2}\log\left(1 + \frac{h_{22}^2 \bar{\beta} P}{h_{21}^2 \beta P + N}\right)$$

wherein, N is a noise variance, βP is a power constraint, $h_{11} = h_1^T a$, $h_{21} = h_2^T a$, $h_{22} = h_2^T b$, $h_1$ and $h_2$ refer to channel state information, and a and b are vectors.

4. The method of claim 2, wherein the mapping of the subtraction result on the fundamental Voronoi region of the lattice for the first receiver comprises using a modulo operation.

5. A method of dirty paper decoding using nested lattices for a receiver receiving from a transmitter that sends to at least two receivers, the method comprising:

receiving a signal from the transmitter; and decoding the received signal through a modulo operation with respect to a scaled lattice, wherein the received signal is generated by scaling a lattice so that interference due to a second receiver is mapped to a lattice point of a lattice for a first receiver, subtracting the interference from a signal to be sent to the first receiver, and mapping the subtraction result on a fundamental Voronoi region of the lattice for the first receiver.

6. The method of claim 5, wherein the decoding of the received signal further comprises linear filtering and dither removal prior to the modulo operation.

7. The method of claim 5, wherein the scaled lattice comprises a scaled fine lattice for one of the at least two receivers.

8. The method of claim 7, wherein the fine lattice of the at least one of at least two receives is scaled using at least one of the following equations, $$\frac{1}{2}\log\left(1 + \frac{h_{11}^2 \beta P}{N}\right) \text{ and } \frac{1}{2}\log\left(1 + \frac{h_{22}^2 \bar{\beta} P}{h_{21}^2 \beta P + N}\right)$$

wherein, N is a noise variance, βP is a power constraint, $h_{11} = h_1^T a$, $h_{21} = h_2^T a$, $h_{22} = h_2^T b$, $h_1$ and $h_2$ refer to channel state information, and a and b are vectors.

* * * * *